T. H. DISERENS.
BALING PRESS.
APPLICATION FILED JUNE 6, 1910.

979,659.

Patented Dec. 27, 1910.
2 SHEETS—SHEET 1.

WITNESSES:
L. E. Noack.

INVENTOR
Thomas H. Diserens
BY
ATTORNEYS.

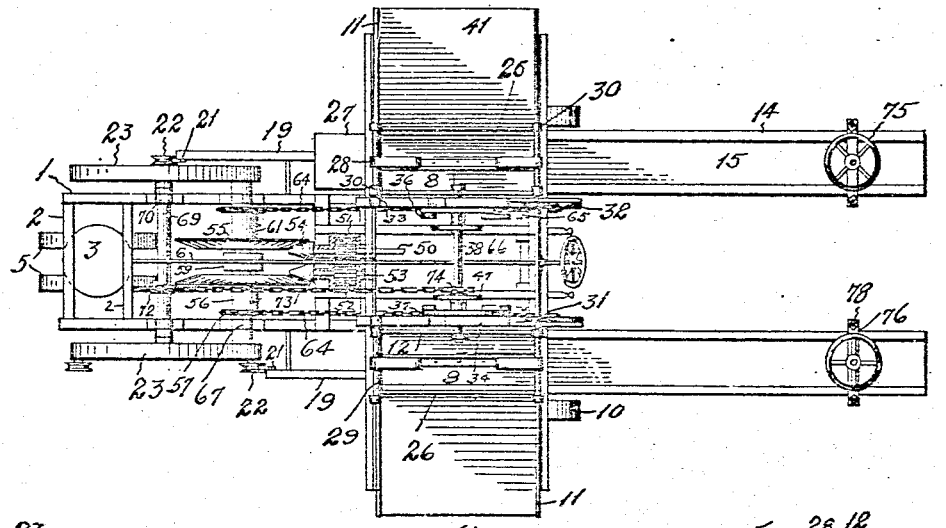

UNITED STATES PATENT OFFICE.

THOMAS H. DISERENS, OF DALLAS, TEXAS.

BALING-PRESS.

979,659.  Specification of Letters Patent.  Patented Dec. 27, 1910.

Application filed June 6, 1910. Serial No. 565,384.

*To all whom it may concern:*

Be it known that I, THOMAS H. DISERENS, citizen of the United States, residing at Dallas, in the county of Dallas and State of Texas, have invented certain new and useful Improvements in Baling-Presses, of which the following is a specification.

This invention has relation to presses and particularly to power baling presses.

The object of the invention is the provision of certain novel features of construction, such as hopper feeding wings, vertically operating tampers, and reciprocating plungers coöperating with the wings and the tampers, in combination with novel operating devices.

Finally the object of the invention is to provide means of the character described that will be strong, durable, efficient, and easy of operation, simple and comparatively inexpensive to construct, and also in which the several parts will not be likely to get out of working order.

Figure 1:
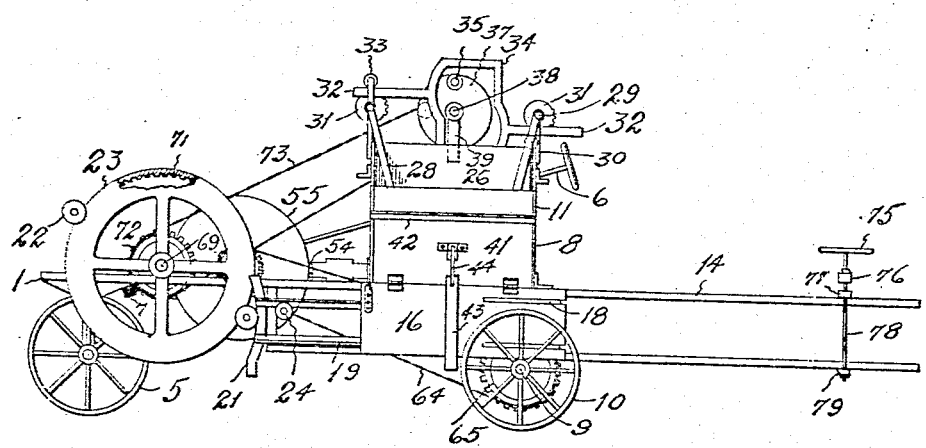
Figure 2:
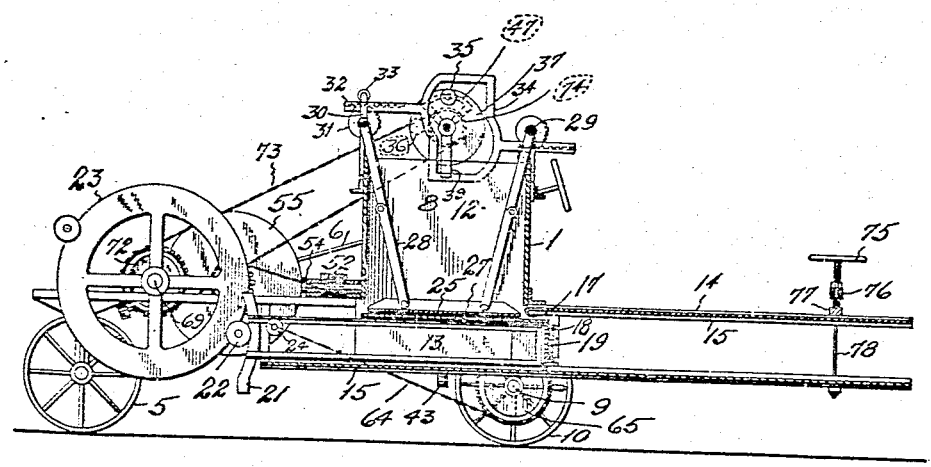

With the above and other objects in view, the invention has relation to certain novel features of construction and operation, an example of which is described in this specification and illustrated in the accompanying drawings, wherein:

Figure 1. is a side elevation of the press. Fig. 2. is a vertical section through one of the press boxes, Fig. 3. is a plan view, Fig. 4. is an end elevation, Fig. 5. is a detail of the transmission and clutch, Fig. 6. is a detail in vertical section of one of the plunger heads and adjacent parts, Fig. 7. is a detail of one of the wing swinging cams and parts, and Fig. 8. is a detail in section of the tamper and wing operating mechanism at one side of the press.

In the drawings, the numeral 1, designates the frame of the press on the rear portion of which cross bars 2 are secured. These bars support an underhung plate 3 against which a pivoted truck 4 bears. The truck is supported on a pair of rear wheels 5 and adapted to be rotated by a steering rod 6 having a pinion 7 at its lower end engaging with the truck. At the central portion of the press and at the forward end of the frame, a feeding box 8 is formed at each side. These feeding boxes are supported on a transverse axle 9 fixed in ground wheels 10 at its ends. Each feeding box comprises transverse side boards 11 connected at their inner ends by a vertical wall 12. The wall 12 projects below the side boards and forms one side of a baling chamber 13. Angle irons 14 and top and bottom plates 15 are disposed so as to form bale guides at each side of the press and a baling chamber at the bottom of each feeding box. A vertical plate 16 co-acts with the bottom plate 15 and wall 12 in forming each baling chamber 13. As shown in Figs. 2 and 6 the top plate 15 is bent to form a downwardly extending dog 17 at the feeding box which prevents the plunger from drawing material back into the baling chamber, in which action it is assisted by spring dogs 18 on each side of each baling chamber. In each baling chamber a plunger 19 is supported on rollers 20 rolling on the bottom plate 15. At its outer end the plunger has a curved vertical shoe 21 in position to be engaged by rollers 22 of a pressing wheel 23. The plunger is guided and held in position by a roller 24. In each feeding box a tamper 25 is arranged. This tamper is of such size as to freely enter the baling chamber and carries on its outer edge a vertical guard sheet 26 fitting snugly between the side boards 11 and extending to the upper edge of the same when the tamper is in its lowermost position. Each plunger has a top plate 27 which prevents material falling thereunder. When the tamper is in its lowermost position it is just over the guard plate in each feeding box. Each tamper is pivotally supported on the lower ends of upwardly diverging knuckle links 28. The knuckle links in each feeding box are fixed at their upper end on short transverse shafts 29 supported in brackets 30. It is apparent that when the knuckle joints are straightened out as indicated in Fig. 2, they will not yield to upward pressure against the tamper 25. Over each feeding box mutilated gears 31 are fixed on the shafts 29 and adapted to engage channel racks 32. These channel racks are held in engagement with gears 31 by the innermost brackets 30 and rollers 33 carried by the brackets. The channel racks extend from opposite sides of a shifting frame 34. The racks 32 over each feeding box engage on opposite sides of the gears so that if the frame is moved in one direction the knuckle links 28 will be broken and swung upward and when the said frame is moved in the reversed direction, the knuckle links will be swung downward and straightened out. It is apparent that this movement of the knuckle links raises and lowers each tamper. Each shifting frame is operated by rollers 35 and 36 mounted on opposite sides of a disk 37. The disk 37 is mounted on a transverse shaft 38 rotating in brackets 39 secured on the upper ends of the walls 12. It is obvious that as the disk 37 is revolved the roller 35 on one side will engage the frame 34 and shift it to the left (Fig. 2) which will swing the knuckle links and tamper upward. During this movement the roller 36 being on the opposite side of the disk will not contact with the frame until after it has been shifted to the left, when the roller 36 will engage a cam 49 and shift the frame to the right (Fig. 2) which will swing the links and tamper downward. The frame is slotted to receive the disk when said frame is shifted to the left.

It is obvious that the side boards 11 projecting outwardly from each guard sheet 26 form the sides of hoppers. Between each pair of side boards a wing 41 is arranged being pivoted at its lower end to the upper outer corner of the baling chamber and resting against a cross bar 42 when in its open position. When the tamper is down the hopper on each side of the press is formed by the side boards 11, the sheet 26 and the wing 41. The material to be pressed is fed into these hoppers. For swinging each wing upward a bell crank lever 43 hinged to the lower outer side of the baling chamber is provided. At its upper and outer end each lever has pivotal connection with a short link 44 pivotally connected to the wing. At its inner end the lever 43 has connection with the lower end of a tripping lever 45 having its upper end forked at 46. The forked portion of the lever straddles the shaft on each side of a quadrant 47 fixed on the shaft 38. At one end the quadrant carries a roller 48 adapted to engage the curved face of a cam 49 projecting from the lever 45. It is obvious that the engagement of the rollers with the cams 49 will depress the levers 45 and swing the wings 41 upward in the hoppers which will throw the material into the baling chambers, the tampers and guard sheets 26 having been raised by the shifting frame. By observing Fig. 2 it will be noted that the roller 48 occupies a position midway between the rollers 35 and 36. By this arrangement the roller 35 will have shifted the frame 34 and raised the tamper and guard sheet about two-thirds their upward movement before the roller 48 begins to depress the cam 49 and swing the wing 41 upward.

For operating the various parts and for imparting motion to the axle 9 a suitable engine (not shown) may be mounted on the frame 1 between the feeding boxes 8. This engine drives a transmission and clutch by suitable connection with a shaft 50. As shown in Fig. 3, the shaft has mounted thereon, a gear 51 which meshes with a gear 52 of equal diameter mounted on a shaft 53. This gearing causes the shafts 50 and 53 to revolve in opposite directions. On the end of each shaft a friction cone pinion 54 is fixed. These pinions engage with beveled friction disks 55. While the shafts 50 and 53 and the pinions revolve in opposite direction, the disks 55 are caused to revolve in the same direction. Each disk as shown in Fig. 5 has an elongated hub 56 provided with a sprocket 57 near its outer end. The disks are loosely mounted on a drive shaft 58 and on each side of a collar 59 fixed on said shaft. On each side the collar has a pocket 60 adapted to receive a spring pressed clutch pin 61 mounted to slide through the adjacent disk and sprocket 57. Each clutch pin is provided with a lever 62 by which the pin may be moved horizontally and engaged against a stud 63 projecting from the hub 56 and thus lock the pin out of engagement with the pocket of the collar 59. When the pins are in engagement with the pockets 60 motion will be imparted to the shaft 58 and when the pins are withdrawn the disks 55 and their hubs and sprockets will revolve freely upon the shaft 58 which will remain idle. The sprockets 57 have connection by means of chains 64 with sprockets 65 mounted loosely on the axle 9. Suitable clutches 66 are provided and adapted to be engaged with the sprockets 65 whereby motion will be transmitted to the axle. When the press is being operated and it is not desired to propel the same, the clutches 66 are thrown out of engagement with the sprockets 65.

As shown in Figs. 3 and 5 the shaft 58 is supported in bearing boxes 67 mounted on the frame 1. The ends of the shaft project beyond the frame 1 and have fixed thereon pinions 68. A shaft 69 is mounted in bearings 70 on frame 1 and on the ends of this shaft the pressing wheels 23 are fixed. Each pressing wheel is provided with an internal gear rack 71 disposed on its inner periphery and engaged by one of the pinions 68. In this way motion is transmitted to the pressing wheel by the shaft 58, except when the clutch pins are withdrawn from the pockets 60 of the collar 59. It is obvious that as the pressing wheels are revolved, the rollers 22 will successively engage the shoe 21 and force the plunger 19 of each baling chamber into the same twice during the revolution of each pressing wheel, the resiliency of the material in the baling chambers causing the plungers to rebound into the path of the rollers 22. On the shaft 69 a sprocket 72 is fixed and drives by a chain 73, a sprocket 74 fixed on the shaft 38. The relative diameters of the sprockets 72 and 74 are such as to cause the shaft 38 and the part fixed thereon to revolve twice, or make two complete revolutions to one complete revolution of the shaft 69 and pressing wheels 23. The parts are so timed that the plungers will be driven into the baling chambers at the time the tampers 25 are in their lowermost position and the wings 41 swung outward.

It will be understood that material thrown into the hoppers is forced into the feeding boxes under the tampers 25 by the wings 41 after the tampers have been raised and then forced down into the baling chambers by the tampers as the same are lowered. The material thus forced down into the baling chambers is baled by the plungers when the same are driven inward, the baled or compressed material being forced outward between the plates 15. The density of the bales may be varied by adjusting the hand wheels 75 which are provided with threaded shanks passing through cross heads 76 and bearing on cross bars 77. The cross heads 76 have connection with bottom bars 79 by side links 78. By adjusting the hand wheels and moving the bars 77 and cross heads 76 apart, the plates 15 are drawn together which would converge said plates, offer more resistance to the passage of the baled or compressed material and increase the density.

What I claim is:

1. In a baling press, a frame, baling chambers at each side of the frame, plungers operating in the chambers, tampers reciprocating over the baling chambers, side boards above the chambers, a guard sheet carried by each tamper between the side boards, a wing pivoted between each pair of side boards, and mechanism for swinging the wings and reciprocating the plungers and the tampers.

2. In a baling press, a frame, feeding boxes mounted on the frame, baling chambers in the lower portion of the feeding boxes, plungers reciprocating in the chambers, pressing wheels mounted on the frame and operating the plungers, a tamper reciprocating vertically in each feeding box, a vertical guard sheet carried by each tamper, and a swinging wing in each feeding box mounted outside of the tamper.

3. In a baling chamber, a frame, feeding boxes mounted on the frame, baling chambers in the lower portion of the feeding boxes, plungers reciprocating in the chambers, pressing wheels mounted on the frame and operating the plungers, a tamper reciprocating vertically in each feeding box, a vertical guard sheet carried by each tamper, a swinging wing in each feeding box mounted outside of the tamper, and means for swinging the wings when the tampers are raised.

4. In a baling press, a frame, feeding boxes mounted on the frame, plungers reciprocating in the feeding boxes, tampers reciprocating in the feeding boxes, wings swinging laterally in the feeding boxes, a shaft extending transversely of the feeding boxes, devices mounted on the shaft for reciprocating the tampers and swinging the wings, and means for imparting rotation to the shaft.

5. In a baling press, a feeding box, a tamper mounted in the feeding box, links supporting the tamper, a shifting frame for swinging the links, a shaft associated with the frame, a device carried on the shaft engaging the frame for shifting the same, and means for imparting rotation to the shaft.

6. In a baling press, a feeding box, a reciprocating tamper mounted in the feeding box, a swinging wing mounted in the box, a lever having connection with the wing, an operating shaft mounted above the feeding box, a rod connected to the lever and engaging the shaft, and a depressing device carried by the shaft and engaging with the rod.

7. In a baling press operating mechanism, a wing, a transverse shaft, a shifting frame at right angles to the shaft, a device mounted on the shaft and engaging the frame for shifting the same, a wing operating rod engaging the shaft, and a device carried on the shaft for depressing the rod.

8. In In a baling press, a frame, feeding boxes mounted on the frame, plungers operating in the feeding boxes, tampers reciprocating in the boxes, a shaft mounted near the feeding boxes, connections with the tampers arranged to be swung by the shaft, pressing wheels mounted on the frame, devices carried by the wheels in position to engage the plungers, a drive shaft mounted on the frame, pinions on the drive shaft engaging with the pressing wheels, and means for imparting rotation to the drive shaft.

9. In a baling press, a frame, feeding boxes mounted on the frame, plungers operating in the feeding boxes, tampers reciprocating in the boxes, a shaft mounted near the feeding boxes, connections with the tampers arranged to be swung by the shaft, pressing wheels mounted on the frame, devices carried by the wheels in position to engage the plungers, a drive shaft mounted on the frame, pinions on the drive shaft engaging with the pressing wheels, and mechanism for imparting rotation to the drive shaft comprising, friction disks mounted loosely on the shaft, a collar fixed on the shaft between the disks, clutch devices extending through the disks adapted to engage the collar, and a transmission device for imparting motion in the same direction to both disks.

In testimony whereof I have signed my name to this specification in the presence of two subscribing witnesses.

THOMAS H. DISERENS.

Witnesses:
 JACK A. SCHLEY,
 Z. M. DUCKWORTH.